United States Patent [19]
Swain

[11] 3,780,323
[45] Dec. 18, 1973

[54] INSULATINGLY COVERED DYNAMOELECTRIC MACHINE
[75] Inventor: Carl E. Swain, Fort Wayne, Ind.
[73] Assignee: General Electric Company, Fort Wayne, Ind.
[22] Filed: Sept. 15, 1971
[21] Appl. No.: 180,757

[52] U.S. Cl. .................... 310/43, 310/71, 310/194, 310/214
[51] Int. Cl. ............................................ H02k 1/04
[58] Field of Search ...................... 310/259, 93, 71, 310/217, 194; 310/214

[56] References Cited
UNITED STATES PATENTS

| | | | |
|---|---|---|---|
| 3,075,250 | 1/1963 | Strohm et al. | 310/43 UX |
| 3,226,585 | 12/1965 | Roe | 310/194 |
| 2,944,297 | 7/1960 | Maynard | 310/71 X |
| 3,210,577 | 10/1965 | Hogue | 310/43 |
| 2,961,555 | 11/1960 | Towne | 310/43 |
| 3,030,528 | 4/1962 | De Jean | 310/217 X |
| 3,027,475 | 3/1962 | Gaudry | 310/43 X |

FOREIGN PATENTS OR APPLICATIONS
759,960   10/1956   Great Britain ..................... 310/43

Primary Examiner—D. F. Duggan
Attorney—Joseph B. Forman et al.

[57] ABSTRACT

Insulation systems as well as winding retaining means for dynamoelectric machines having winding accommodating magnetic cores and methods of making same are described. Ground insulation system may include one or more formed in situ insulation members with portions thereof providing retainer means for constraining windings accommodated by a magnetic core from undesired movement. With tongue shape retainer means, access means may also be provided for facilitating the removal of defective winding turns accommodated on a given core. With formed in situ insulating members, retainer means for terminals and terminal boards may be provided along with winding retainer means, by little effort and expense. Similarly, spacer and other means may be provided. In one exemplification, formed in situ insulation system, coupled with molded housing means for winding turns provide substantially improved isolating insulation system for winding turns.

2 Claims, 6 Drawing Figures

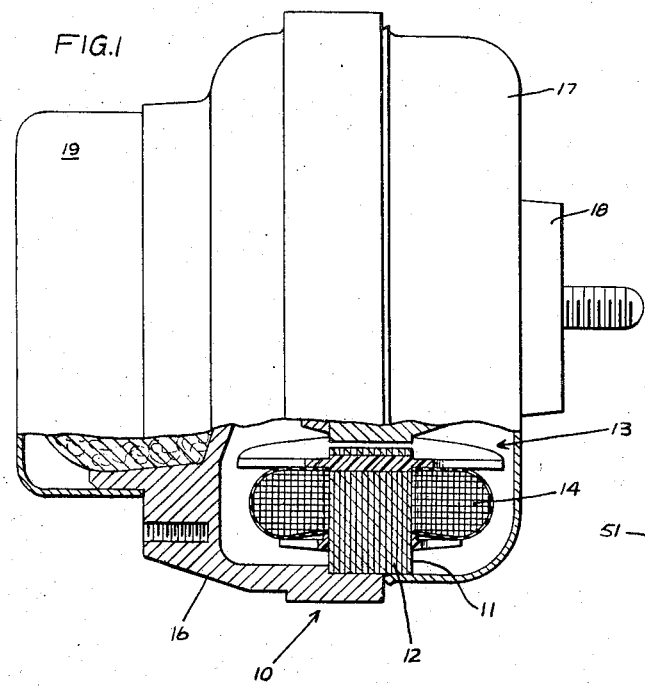
FIG.1
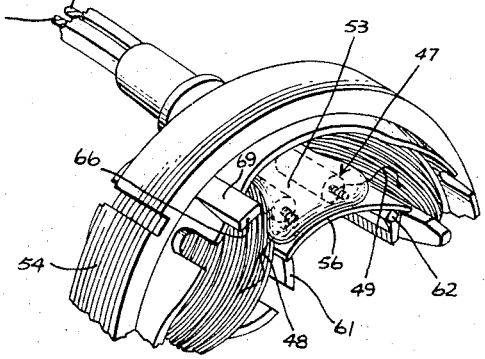
FIG.5
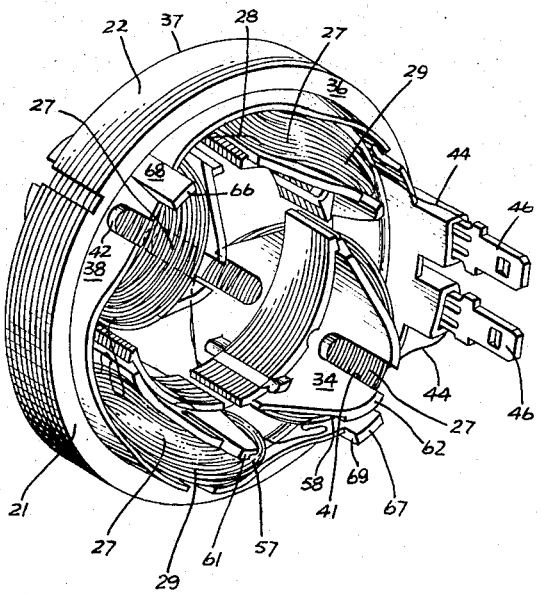
FIG.2
FIG.6
INVENTOR:
Carl E. Swaim,
BY Ralph E. Krisher Jr.
ATTORNEY.

INVENTOR:
Carl E. Swaim,
BY Ralph E. Kusher Jr
ATTORNEY.

INSULATINGLY COVERED DYNAMOELECTRIC MACHINE

CROSS REFERENCE TO RELATED APPLICATIONS

Church U.S. Pat. application Ser. No. 99,049 titled LAMINATED STRUCTURE WITH INSULATING MEMBER FORMED IN SITU THEREON AND METHOD AND APPARATUS FOR ACHIEVING SAME and filed Dec. 17, 1970, which issued as U.S. Pat. No. 3,709,457 on Jan. 9, 1973; Deuter U.S. Pat. application Ser. No. 180,770 filed on Sept. 15, 1971 and titled PRESSURE MOLDED ARTICLES, COMPOSITION, AND METHOD OF MAKING SAME; and Deuter and Shaffer U.S. Pat. application Ser. No. 180,728 titled APPARATUS AND METHOD FOR MAKING A MOLDED ELECTRICAL STRUCTURE and filed on September 15, 1971 are related applications. The disclosures of all three of the above applications are specifically incorporated herein by reference.

BACKGROUND OF THE INVENTION

The present invention relates to dynamoelectric machines and, more particularly, to such machines including molded in situ insulation material.

Heretofore, what has come to be known as ground insulation for dynamoelectric machine (e.g., transformer, motor, and generator) magnetic cores have been provided by following one of several different approaches. In the case of motor stator cores, for example, separate insulators for winding accommodating core slots have sometimes been provided. Such insulators have been formed from materials such as kraft paper, cellulose acetate or still other plastic materials.

Another approach has involved an "integral insulation" as taught for example in Baciu U.S. Pat. No. 2,978,371, issued Apr. 4, 1961, which is assigned to the assignee of the present invention. Of course integral insulation has also been applied by powdered spray and fluidized bed approaches.

All of the above approaches have been, however, relatively expensive in practice — for both material and labor.

Still other relatively expensive aspects of dynamoelectric machine manufacture has been related to providing means for holding laminations together in stacked relationship and for retaining winding turns in a desired position on a stator core. One technique used heretofore to solve multiple problems is shown, inter alia, in DeJean U.S. Pat. No. 3,030,528, issued Apr. 17, 1962. This patent discloses, for example, a method of holding core laminations together during the application of insulating and bonding material without use of keys, rivets, welds, or the like which tend to increase core losses during machine operation. For example, core laminations are held together by the use of winding retaining pins fitted tightly into winding pin holes through core laminations.

Though the use of winding pins to hold core laminations together in conjunction with the use of ground insulation material between the energizing coils and magnetic core did indeed advance the dynamoelectric machine art it would nevertheless, of course, be desirable to reduce, if not eliminate the material and labor cost due to the use of such pins. Moreover, the expense related to protecting and or holding termination means would also, desirably, be produced.

Church U.S. Pat. No. 3,709,457; Deuter U.S. Pat. application Ser. No. 180,770 and Deuter et al. U.S. Pat. application Ser. No. 180,728 disclose noteworthy and valuable advances in the art, however, and it would be desirable to provide new and improved dynamoelectric machines and methods of making the same that overcome the previously stated problems and also, where desirable, practice the invention of such Church, Deuter et al., and Deuter applications.

SUMMARY OF THE INVENTION

Accordingly, it is an object of the present invention to provide an improved dynamoelectric machine.

A further object of the present invention is to provide a dynamoelectric machine stator core formed of a stack of magnetic laminations and having molded in situ insulation means and a molded interstitial structure for at least some winding turns accommodated on the core.

Another object of the invention is to provide a dynamoelectric machine with improved insulating retaining means and molded in situ insulation.

Still another object of the invention is to provide a salient pole dynamoelectric machine with a molded in situ body of electrical insulation covering winding accommodating regions of the core and that also includes winding and/or termination means retaining means.

A still further object of the present invention is to provide a dynamoelectric machine having a body of insulation formed in stiu thereon which includes means for accommodating winding removal and core salvage operations.

In carrying out the above and other objects in one preferred form, there is provided a dynamoelectric machine comprising a laminated magnetic core having inner and outer peripheral surfaces and winding accommodating means, in the form of winding accommodating slots, disposed between such surfaces.

In one exemplification, molded in situ insulating means provide ground insulation for the winding and may also include retaining means for retaining winding turns and/or terminations in a predetermined position relative to the core. In another exemplification, a substantially solid and rigid interstitial mass of particulate material is secured in place by a substantially solid and rigid matrix to cover at least part of at least some winding turns. In both exemplifications, winding retaining means preferably include tongues projecting from at least one end face of the core, the tongues being provided with means in the form of slots for facilitating winding removal and core salvage operations. In addition, retaining means for terminations including terminal receiving receptacles or receptacles for a termination supporting member are provided and may be formed from formed in situ insulating material. A preferred method includes, in one form, molding insulation material in situ on a magnetic core, accommodating winding turns on the core, and molding a protective covering against at least part of the winding turns.

The subject matter which I regard as my invention is set forth in the appended claims. The invention itself, however, together with further objects and advantages thereof may be better understood by referring to the following more detailed description taken in conjunction with the drawings.

BRIEF DESCRIPTION OF THE DRAWINGS

FIG. 1 is a side elevation, with parts in section and parts broken away of a dynamoelectric machine embodying the invention in one form;

FIG. 2 is a perspective view of a portion of the dynamoelectric machine of FIG. 1;

FIG. 5 is a perspective view, with parts broken away, of a wound stator core to illustrate another exemplification of the invention; and FIG. 6 is a side elevation, with parts in section and parts broken away, of another embodiment of the invention.

DESCRIPTION OF THE PREFERRED EMBODIMENTS

Figure 3:
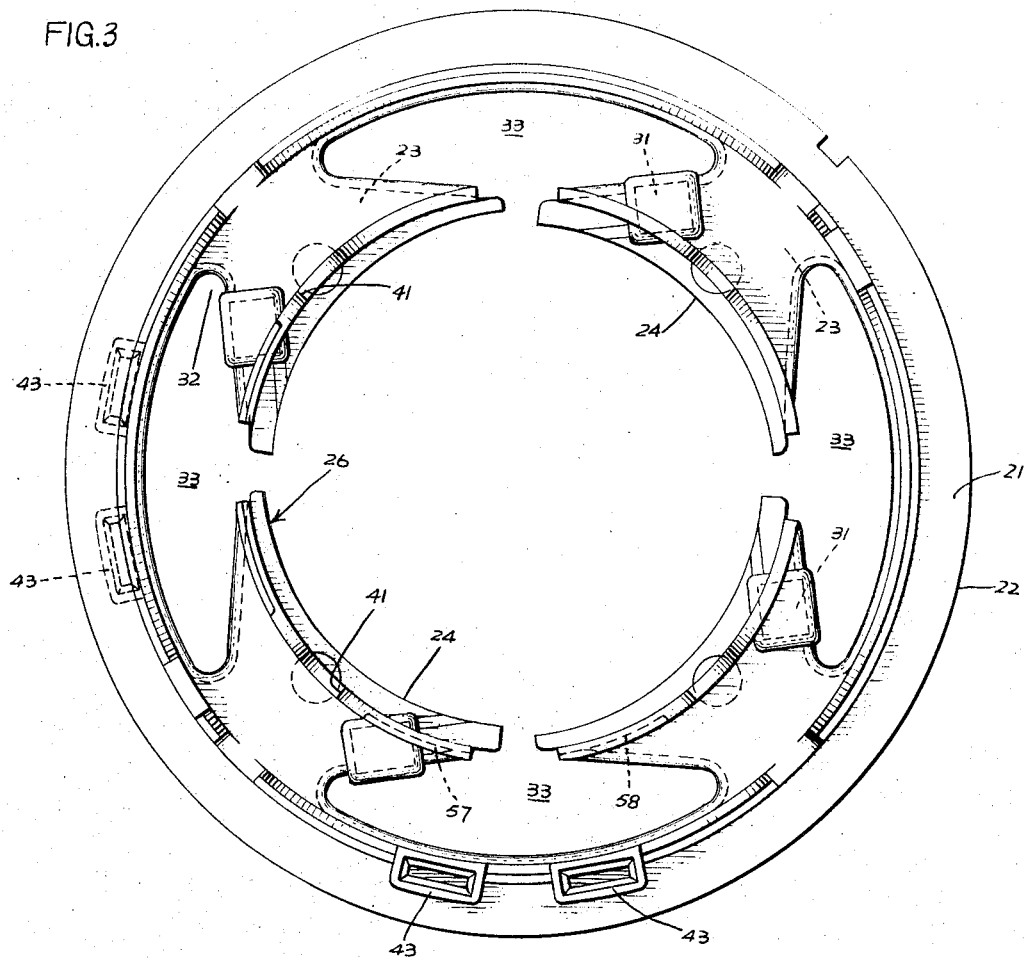
FIG. 3 is a plan view with parts removed, of the structure of FIG. 2.

Referring now in more detail to the drawings, there is shown in FIG. 1 a dynamoelectric machine illustrated as a motor 10, embodying the invention in one form. The motor 10 includes a stator core 11 comprised of a stack of magnetic laminations 12, molded in situ insulating means indicated generally by the numeral 13, a winding 14, cast iron shell 16, steel cover 17, a conventional rotor 18, oil well cover 19, and termination means not shown in FIG. 1.

The motor 10 of course includes other assembled components such as bearing means and a lubrication system, as will be understood by persons skilled in the art.

Figure 4:
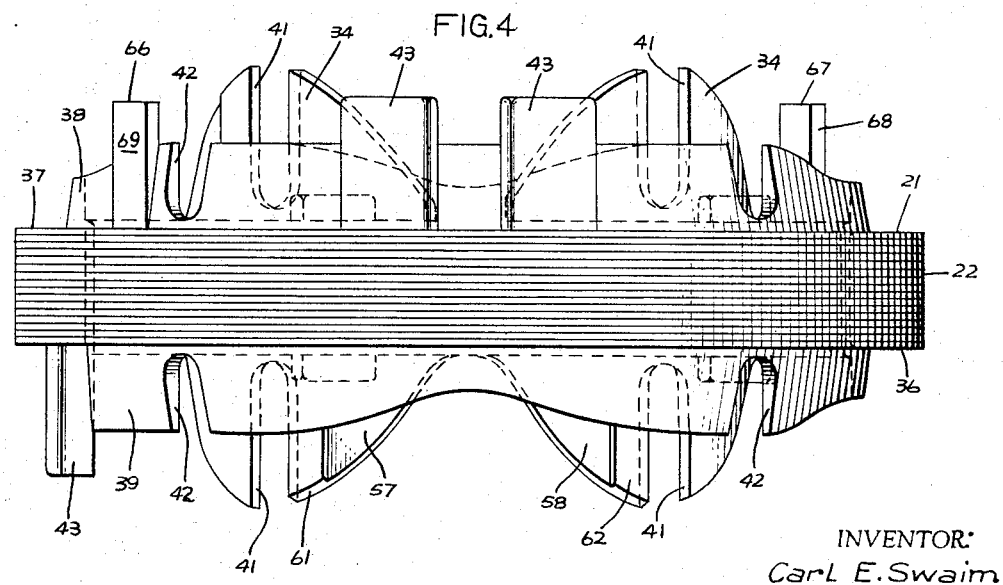
FIG. 4 is a side elevation of the structure of FIG. 3.

Turning now to FIGS. 2, 3, and 4, the core 11 includes a magnetic yoke section 21 with an outer peripheral surface 22 and also includes radially inwardly projecting tooth sections 23 for establishing salient polar regions or poles. The tips of sections 23 in turn define inner peripheral surfaces 24 that collectively define the bore 26 of the stator core. It should be specifically noted at this point that a salient pole stator core has been selected for purposes of exemplification only and that the invention may also be embodied in other types of apparatus, including distributed wound or non-salient pole motors and generators or alternators. About each pole defining tooth section is wound a winding coil 27 having a plurality of side turn portions 28 and end turn portions 29 as will be understood. In addition, one or more shading coils 31 are provided for each pole.

Ground insulation, i.e., insulation between the magnetic core and winding coils is molded in situ on the core as shown at 32. The insulation 32 covers at least those portions of each tooth section adjacent to which side turn or end turn portions of the winding are to be disposed. This covering then electrically insulates the energizing coils from the laminated magnetic core.

Thus, ground insulation is provided for coils accommodated by winding accommodating regions of the core 11. More specifically, windings disposed in the winding accommodating slots 33 are separated by insulating material from the laminations of core 11.

As may be seen more clearly by reference to FIGS. 2 and 4, the molded in situ insulation or insulating means also includes a plurality of retaining means. Preferably, this includes termination and winding retaining means.

In a preferred form, the winding retaining means includes a plurality of tongues 34 that project substantially normally from each end face 36, 37 of the core 11. There situated, the tongues serve to retain the energizing coils from undesired movement toward the inner peripheral surface of the core 11. This arrangement is of particular advantage while placing the winding turns on the core 11.

Also as best shown in FIGS. 2 and 4, winding retaining means may be arranged to retain the windings from movement toward the outer peripheral surfaces of the core 11 and, accordingly, cylindrical rims 38, 39 are provided to project substantially normally from each core end face 36, 37. The edges of rims 38, 39 are wavy with wave crests and with wave troughs disposed therebetween as illustrated. These rim portions retain the winding against movement and are of particular advantage when the windings are subjected to a flowable blended molding composition in a molding process as described in more detail in Deuter U.S. Pat. application Ser. No. 180,770 and Deuter et al. U.S. Pat. application Ser. No. 180,728 and as will be discussed hereinafter in more detail in conjunction with a description of FIG. 6.

Tongues 34 are each seen to be bifurcated by notches 41. Rims 38 likewise have notches 42 therein. Each of the illustrated notches is disposed adjacent the centerline of a winding coil. These notches facilitate core salvage by providing improved access of tools to the winding coils so that damaged windings may be cut and removed from a core. During salvage operations a wire cutting tool may be inserted through the notches into contact with each side of the coils simultaneously if desired. This would be done, for example, if a conventional test showed that the winding was damaged after or during placement on a core.

The retaining means of the preferred embodiment also includes termination retainers in the form of a pair of hollow projections or receptacles 43 which extend substantially normally from one of the core ends. One or more coil wires 44 having insulation stripped therefrom may be electrically connected with a terminal 46 to form a termination means, with the terminals then being placed and retained in the receptacles as best shown in FIG. 2.

Alternatively, the winding termination means may be in the form illustrated by FIG. 5 wherein such means are generally denoted by the reference numeral 47. The means 47 include an electrical interconnection between coil leads 48, 49 and lead wires 51, 52; a barrier 53 of thermoresponsive material such as General Mills Company's "Versamid" material disposed to prevent the inadvertent removal of the termination means 47 from the core 54; and a barrier supporting member 56. The barrier supporting member in turn is disposed in receptacle means that are shown as notches 57, 58 formed in two adjacent tongue shaped retaining member 61, 62 in FIGS. 2, 4 and 5.

I have also provided spaced apart surface areas, designated as areas 66 and 67 in FIGS. 2 and 4 and which are illustrated as the ends of locating spacers or tabs 68, 69 which are formed in situ with the insulating means. The surface areas 66, 67 are located preselected distances from the end face 36 of the core and are of particular advantage when an insulating covering is to be molded against all or part of at least the winding as will be described hereinafter.

The molded body of insulation is preferably formed in situ on the laminated magnetic portions of the stator core by following the teachings of Church U.S. Pat. No. 3,709,457 so as to not increase the electrical losses of the core as a result of compressive stresses therein. This may be done by positioning stack 10 under predetermined compressive force by clamping means such as pressure pins mounted in the cavity of suitable molding apparatus. An unhardened polyamide resin at elevated temperature may then be introduced under pressure into the closed mold cavity. A particularly well suited and readily available nylon material for this purpose is Zytel 101 resin sold by the E. I. du Pont de Nemours and Co., Inc. This material is preferably moved into the mold at about 580° F. under pressure of about 12,000 psi, again, all as taught in the incorporated by reference Church patent.

With reference now to FIG. 6, I have there shown a portion of still another dynamoelectric machine embodying the invention in an even more preferred form. In the case of the dynamoelectric machine 80, an insulating covering is provided substantially entirely around the molded in situ insulating body 81, core 82 and winding 83. Although any one of a number of different processes may be used for forming this insulating covering, generally denoted by the reference numeral 84, more satisfactory results have been obtained by utilizing the approaches taught by Deuter et al. in their U.S. Pat. application Ser. No. 180,728 and by utilizing materials for molding composition as taught in Deuter U.S. Pat. application Ser. No. 180,770. When those approaches are followed (all of the same being specifically incorporated by reference hereinabove), a dynamoelectric machine structure comprising an assembly of components results wherein the windings are substantially completely surrounded by insulating material, the insulating covering separating the windings from the environment of the dynamoelectric machine and the molded in situ insulating member separating the windings from the laminated core. For this exemplification 13 percent glass reinforced nylon insulating material is preferred but not required.

However, all of the advantages that may be obtained by following the teachings of the present invention may just as well be achieved even when an insulating protectice covering is provided for only a part of some of the winding turns of the winding 83.

It will be understood that in the formation of the insulating covering 84, a stator core such as the core 82 having the insulating member 81 and windings 83 positioned thereon is placed in the cavity of a piece of pressure molding equipment which may be of the injection, transfer, or any other suitable pressure molding type.

When this is done, the locating surfaces 66, 67 may advantageously be utilized as bearing surfaces for the wound and insulated core component within the second mold cavity (the first mold cavity being the cavity in which the insulating material 81 is molded in situ on the core). Thereafter, a molding composition comprising a blended matrix forming mixture as described in more detail in the above mentioned Deuter application and a mass of particulate material such as sand are forced, under pressure, into the mold cavity and into intimate engagement with the windings 83, exposed portions of the core 82, and the insulating member 81. At this time, due to the relatively high pressures, velocities, and viscosity of molding composition being employed, the regaining means such as tongues 34 and rim 38 may be of great benefit in preventing undesired movement of the windings relative to the stator core. Moreover, by providing receptacle means in the insulating body, any pressure exerted against the termination means of a core having an insulating covering formed therearound does not bend or otherwise disturb a predetermined dimensional relationship between the winding termination means and the magnetic core within the mold cavity.

Although I have described above and illustrated harein two preferred exemplified dynamoelectric machines and portions thereof embodying the invention in one form, it will be understood that the invention itself will have other applications. Moreover, it should be clear at this time that the advantages and features of the invention are numerous.

Accordingly, while in accordance with the Patent Statutes I havdescribed what at present are considered to be the preferred embodiments of my invention, it will be obvious to those skilled in the art that numerous changes and modifications may be made therein without departing from the invention.

What I claim as new and desire to secure by Letters Patent of the United States is:

1. A dynamoelectric machine comprising a magnetic core having a plurality of spaced apart tooth sections and core surfaces defining at least one winding turn accommodating slot; a body of insulating material molded in situ on the magnetic core that establishes an insulating covering at least for core surfaces defining the at least one winding turn accommodating slot; a plurality of winding turns having side turn and end turn portions, with at least part of the side turn portions of at least some of the winding turns positioned in the at least one winding turn accommodating slot adjacent to said insulating covering, said insulating covering providing electrical insulation between the core and winding turns adjacent thereto; and winding termination means; said body of insulating material including a winding retaining means extending axially from an end face of the magnetic core and having a free extremity spaced from the end face, said body of insulating material defining receptacle means for at least a portion of said winding termination mans; a bundle of winding end turns disposed adjacent to the winding retaining means and extending axially from a first locale in proximity to the core end face toward the free extremity of the winding retaining means; said winding retaining means having at least one tool admitting passage formed therein that extends axially from the free extremity of the winding retaining means along the bundle of winding end turns to a location proximate to the first locale, to facilitate removal of winding turns from the core; said winding termination means comprising an electrical interconnection between said at least one winding and an external lead wire; a mass of electrically insulating material being disposed as a barrier on the interconnection; and a barrier supporting member being supported by said receptacle means.

2. A dynamoelectric machine comprising a magnetic core having a plurality of spaced apart tooth sections and core surfaces defining at least one winding turn accommodating slot; a body of insulating material molded in situ on the magnetic core that establishes an insulating covering at least for core surfaces defining the at least one winding turn accommodating slot; a plurality of winding turns having side turn and end turn portions, with at least part of the side turn portions of at least some of the winding turns positioned in the at least one winding turn accommodating slot adjacent to said insulating covering, said insulating covering providing electrical insulating between the core and winding turns adjacent thereto; and winding termination means; said body of insulating material including a winding retaining means extending axially from an end face of the magnetic core and having a free extremity spaced from the end face, said body of insulating material defining receptacle means for at least a portion of said winding termination means; a bundle of winding end turns disposed adjacent to the winding retaining means and extending axially from a first locale in proximity to the core end face toward the free extremity of the winding retaining means; said winding retaining means having at least one tool admitting passage formed therein that extends axially from the free extremity of the winding retaining means along the bundle of winding end turns to a location proximate to the first locale, to facilitate removal of winding turns from the core; said winding termination means including at least one terminal element and an electrical interconnection between the at least one winding and the at least one terminal element; at least a portion of the at least one terminal element being received in and supported by said receptacle means.

\* \* \* \* \*